United States Patent [19]

Isozaki et al.

[11] Patent Number: 4,923,945

[45] Date of Patent: May 8, 1990

[54] RESIN COMPOSITION CURABLE AT LOW TEMPERATURE

[75] Inventors: Osamu Isozaki, Yokohama; Noboru Nakai, Hiratsuka; Satoru Ito, Kanagawa; Seiji Takami, Hiratsuka, all of Japan

[73] Assignee: Kansai Paint Company, Limited, Amagasaki, Japan

[21] Appl. No.: 268,406

[22] Filed: Nov. 8, 1988

[30] Foreign Application Priority Data

Nov. 9, 1987 [JP] Japan .................................. 62-282335
Nov. 9, 1987 [JP] Japan .................................. 62-282336

[51] Int. Cl.$^5$ .............................................. C08G 77/06
[52] U.S. Cl. ........................................ 528/16; 524/284; 524/285; 524/199; 524/361; 524/367; 524/366; 524/376; 528/17; 528/32; 526/279; 525/476; 525/477
[58] Field of Search ................ 524/284, 285, 199, 361, 524/367, 376, 366; 528/32, 16, 17; 526/279; 525/476, 477

[56] References Cited

U.S. PATENT DOCUMENTS 4,677,137 6/1987 Bany et al. ........................... 526/279
4,743,106 5/1988 Novicky et al. ..................... 526/279

*Primary Examiner*—Melvyn I. Marquis
*Attorney, Agent, or Firm*—Armstrong, Nikaido, Marmelstein, Kubovcik & Murray

[57] ABSTRACT

Disclosed is a resin composition curable at a low temperature and characterized in that the composition comprises:

(a) at least one of a copolymer comprising as its monomer components an oxirane-containing vinyl monomer and an alkoxysilane-containing vinyl monomer and a vinyl copolymer comprising at its monomer components a polysiloxane macromonomer and an oxirane-containing vinyl monomer,
(b) a chelate compound, and
(c) a compound having a number average molecular weight of up to about 1,000 and containing at least two alicyclic oxirane groups in the molecule.

13 Claims, No Drawings

RESIN COMPOSITION CURABLE AT LOW TEMPERATURE

The present invention relates to resin compositions which are curable at low temperatures.

For energy cost reductions, it has been highly desired to develop resin compositions which are curable at low temperatures.

Heretofore chiefly used as low-temperature curable resin compositions are two-package resin compositions such as polyol/isocyanate, epoxy/polyamine and like compositions. These two-package resin compositions are cumbersome to handle since the components of the composition are separately stored in two packages and mixed together immediately before use. Moreover, those comprising an isocyanate have the drawback of being highly toxic.

On the other hand, single-package resin compositions are known which are curable at low temperatures. Unexamined Japanese Patent Publication No.67553/1985, for example, discloses a composition comprising aluminum chelate compound and a vinyl polymer containing as a monomer component an alkoxysilane compound such as methacryloxypropyltrimethoxysilane. With this composition, the silanol group resulting from the hydrolysis of the alkoxysilane group primarily serves as a crosslinking functional group, so that there arises a need to use a large quantity of water for the hydrolysis of alkoxysilane groups if it is desired to obtain a cured product with sufficient hardness. Consequently, the hydrolysis produces large quantities of alcohol, etc. as by-products, which render the cured product roughsurfaced, hence impaired surface smoothness. Further when to be cured only with the water in air, this composition requires a prolonged period of time for curing and encounters difficulty in completely curing in the interior of the composition since curing proceeds from the surface, exhibiting lower hardness. Another problem will then be experienced in that the cured product is prone to shrinkage and inferior in surface smoothness.

Polymerizable unsaturated resin compositions of the single-package type are also known which are curable with the active energy of ultraviolet rays, electron rays or the like. These compositions have the drawback of necessitating an irradiation device.

An object of the present invention is to provide a single-package resin composition which is readily curable by crosslinking at a low temperature when merely allowed to stand in air and which is easy to handle.

Another object of the invention is to provide a resin composition which is curable with lesser quantities of by-products to give a cured product of satisfactory properties.

Still another object of the invention is to provide a resin composition which is curable generally uniformly with a reduced difference between the surface and the interior when applied, giving a cured product having sufficient hardness and yet almost free of shrinkage.

These and other objects and features of the invention will become apparent from the following description.

The present invention provides a resin composition curable at a low temperature and characterized in that the composition comprises:

(a) at least one of a copolymer (hereinafter referred to as the "copolymer X") comprising as its monomer components an oxirane-containing vinyl monomer and an alkoxysilane-containing vinyl monomer represented by the formula

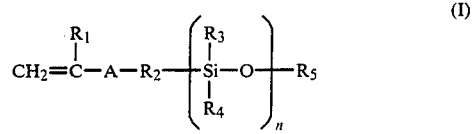

wherein A is

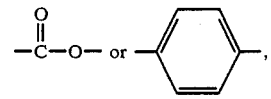

or $R_1$ is a hydrogen atom or methyl, $R_2$ *is a bivalent aliphatic saturated hydrocarbon group having* 1 to 6 carbon atoms, $R_3$ and $R_4$ are the same or different and are each phenyl, alkyl having 1 to 6 carbon atoms or alkoxyl having 1 to 10 carbon atoms, $R_5$ is alkyl having 1 to 10 carbon atoms, and n is an integer of from 1 to 10, and a vinyl copolymer (hereinafter referred to as the "copolymer Y") comprising as its monomer components;

(i) the polysiloxane macromonomer prepared by reacting about 70 to about 99.999 mole % of a compound (A) represented by the formula

wherein $R_6$ is an aliphatic hydrocarbon group having 1 to 8 carbon atoms or phenyl, and $R_7$, $R_8$ and $R_9$ are each alkoxyl having 1 to 4 carbon atoms or hydroxyl with about 30 to about 0.001 mole % of a compound (B) represented by the formula

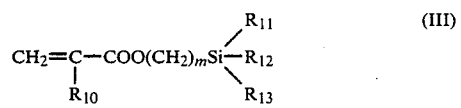

wherein $R_{10}$ is a hydrogen atom or methyl, $R_{11}$, $R_{12}$ and $R_{13}$ are each hydroxyl, alkoxyl having 1 to 4 carbon atoms or an aliphatic hydrocarbon group having 1 to 8 carbon atoms, at least one of $R_{11}$, $R_{12}$ and $R_{13}$ being hydroxyl or alkoxyl, and m is an integer of 1 to 6, the polysiloxane macromonomer having per molecule at least two functional groups selected from hydroxyl and the alkoxyl and being about 400 to about 100,000 in number average molecular weight, and (ii) an oxirane-containing vinyl monomer, (b) a chelate compound, and (c) a compound having a number average molecular weight of up to about 1,000 and containing at least two alicyclic oxirane groups in the molecule.

With the monomer of the formula (I) forming the copolymer X for use in the present resin composition, n is an integer of 1 to 10.

With reference to the formula (I), the bivalent saturated aliphatic hydrocarbon group having 1 to 6 carbon atoms and represented by $R_2$ is a straight-chain or branched-chain alkylene group, such as methylene, ethylene, propylene, 1,2-butylene, 1,3-butylene, 2,3- butylene, tetramethylene, pentamethylene, hexamethylene or the like. The alkyl group represented by $R_3$ and $R_4$ and having 1 to 6 carbon atoms is a straight-chain or branched-chain alkyl group, such as methyl, ethyl, n-propyl, isopropyl, n-butyl, isobutyl, sec-butyl, tert-butyl, n-pentyl, isopentyl, neopentyl, n-hexyl, isohexyl or the like. Examples of alkyl groups represented by $R_5$ having 1 to 10 carbon atoms are above-mentioned alkyl groups and further n-heptyl, 1-methylpentyl, 2-methylhexyl, n-octyl, n-nonyl, n-decyl and the like. The alkoxyl group represented by $R_3$ and $R_4$ and having 1 to 10 carbon atoms is a straight-chain or branched-chain alkoxyl group, such as methoxy, ethoxy, n-propoxy, isopropoxy, n-butoxy, isobutoxy, sec-butoxy, tert-butoxy, n-pentoxy, isopentoxy, n-hexyloxy, isohexyloxy, n-octyloxy or the like. When n in the formula (I) is at least 2, the groups $R_3$, as well as groups $R_4$, may be the same or different.

Of the compounds of the formula (I) for use in the invention, those wherein A is

are, for example, γ-(meth)acryloxypropyltrimethoxysilane, γ-(meth)acryloxypropyltriethoxysilane, γ-(meth)acryloxypropyltripropoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxybutylphenyldimethoxysilane, γ-(meth)acryloxybutylphenyldiethoxysilane, γ-(meth)acryloxybutylphenyldipropoxysilane, γ-(meth)acryloxypropyldimethylmethoxysilane, γ-(meth)acryloxypropyldimethylethoxysilane γ-(meth)acryloxypropylphenylmethylmethoxysilane, γ-(meth)acryloxypropylphenylmethylethoxysilane,

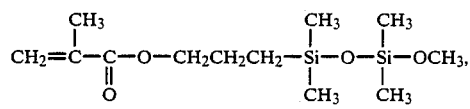

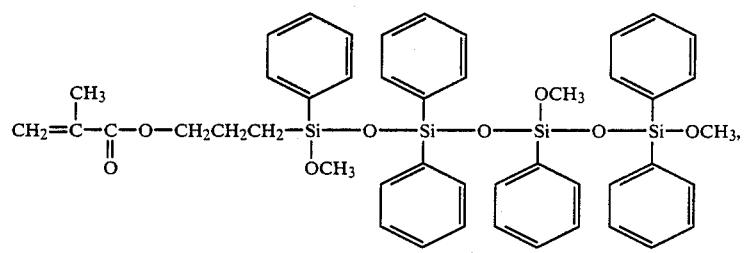

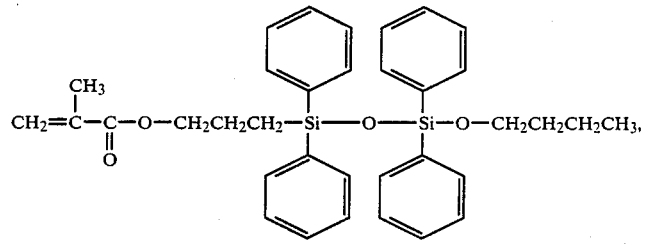

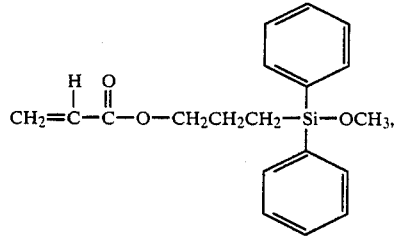

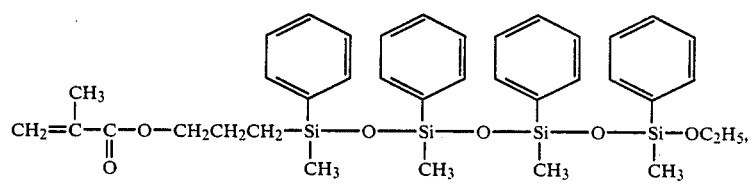

-continued

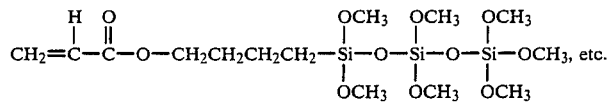

Further of compounds of the formula (I), those wherein A is

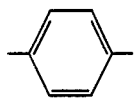

are, for example,

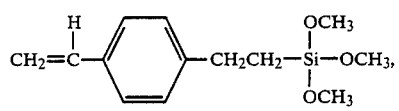

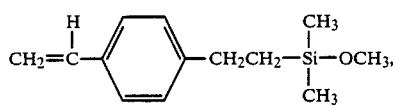

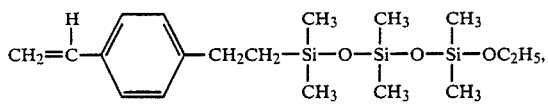

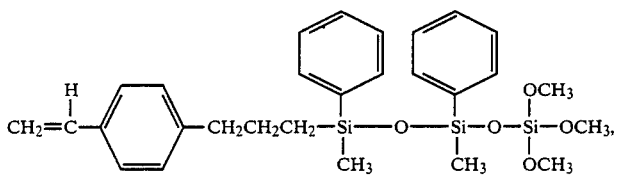

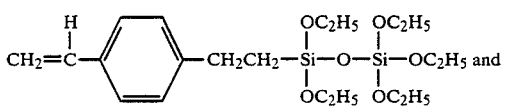

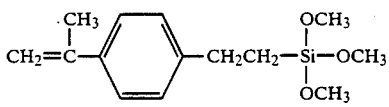

The oxirane-containing vinyl monomer to be used is one of various vinyl monomers having an oxirane group in the molecule.

It is especially desirable to use vinyl monomers containing an alicyclic oxirane group, for example, in view of curability. Use of these monomers results in the advantage of expedited curing and giving improved properties to the coating on curing since the alicyclic oxirane group is highly reactive in ring-cleavage polymerization reaction.

It is more desirable to use acrylic or methacrylic acid esters containing an alicyclic oxirane group, such as those represented by the following formulae (IV) to (XV).

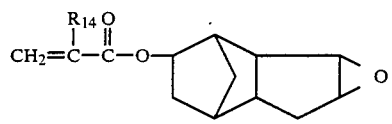

(IV)

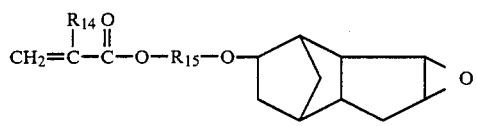

(V)

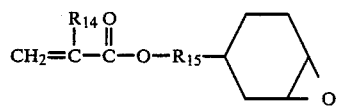 (VI)

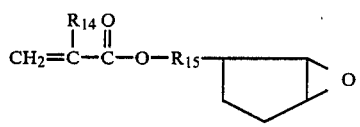 (VII)

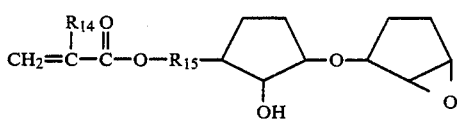 (VIII)

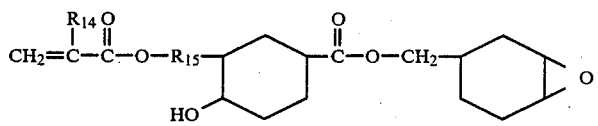 (IX)

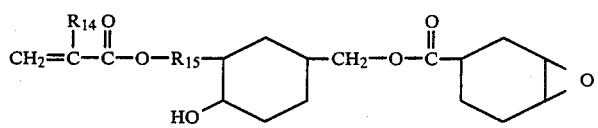 (X)

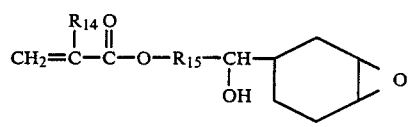 (XI)

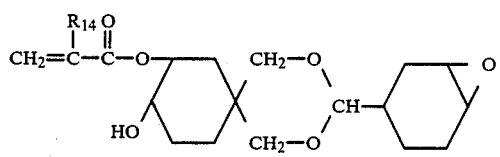 (XII)

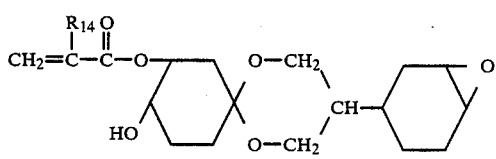 (XIII)

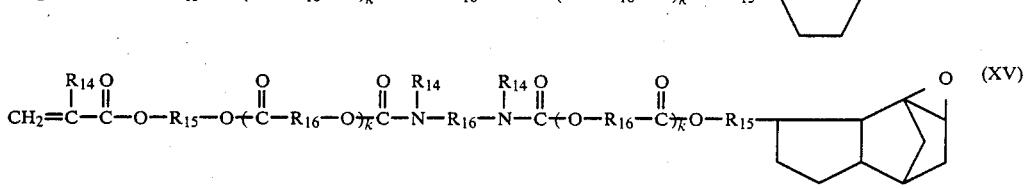 (XIV)

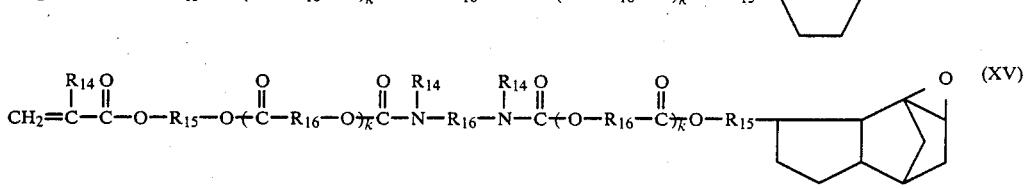 (XV)

In the above formulae, $R_{14}$ is a hydrogen atom or methyl and the $R_{14}$ groups are the same or different, $R_{15}$ is a bivalent aliphatic saturated hydrocarbon group having 1 to 6 carbon atoms and the $R_{15}$ groups are the same or different, $R_{16}$ is a bivalent hydrocarbon group having 1 to 10 carbon atoms and the $R_{16}$ groups are the same or different, and K is an integer of from 0 to 10.

Examples of bivalent aliphatic saturated hydrocarbon groups $R_{15}$ having 1 to 6 carbons are straight-chain or branched-chain alkylene groups such as methylene, ethylene, propylene, tetramethylene, ethylethylene, pentamethylene and hexamethylene. Examples of bivalent hydrocarbon groups $R_{16}$ having 1 to 10 carbon atoms are methylene, ethylene, propylene, tetramethylene, ethylethylene, pentamethylene, hexamethylene, polymethylene, phenylene,

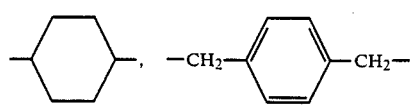

and the like.

Typical of vinyl monomers containing an oxirane group other than the alicyclic oxirane group are, for example, those represented by the following formula (XVI).

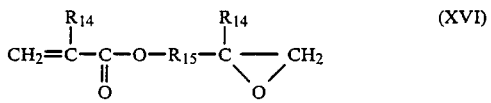

wherein $R_{14}$ and $R_{15}$ are as defined above.

The copolymer X for use in the present curable composition as its resin component is a copolymer comprising an alkoxysilane-containing vinyl monomer of the formula (I) (hereinafter referred to as the "monomer A") and an oxirane-containing monomer (hereinafter referred to as the "monomer B") as its monomer components. Thus, the copolymer X consists essentially of the monomer A and the monomer B. The ratio of the monomer A to the monomer B, i.e. A:B, is usually 1: about 0.02 to about 10,000 by weight. If the monomer B is present in a proportion greater than this range, reduced curability tends to result, whereas the presence of the monomer B in a proportion less than this range gives a cured product of impaired properties with an increased likelihood of shrinkage, hence undesirable. The A:B ratio is preferably 1 : about 0.1 to about 1,000 by weight, more preferably 1 about 25 to about 100 by weight.

In addition to the monomers A and B which are the essential components of the copolymer X, the copolymer X may further contain other $\alpha,\beta$-ethylenically unsaturated monomer conjointly with the monomers when so required. To assure the contemplated advantage of the invention, the $\alpha\beta$-ethylenically unsaturated monomer is used usually in an amount of up to about 99 wt. %, preferably up to about 97 wt. %, based on the combined amount of all the monomers present.

The copolymer X can be prepared by a common process under usual conditions and is in the range of about 2,000 to about 200,000, preferably about 10,000 to about 80,000 in number average molecular weight. When the molecular weight is less than about 2,000, the cured product obtained is low in weather resistance and mechanical properties. If the molecular weight is greater than about 200,000, the composition becomes viscous and is not applicable efficiently, and when diluted with an organic solvent, the composition is not usable with high safety because of a lower solids content and is costly.

The $\alpha\beta$-ethylenically unsaturated monomer which is usable as an optional monomer component of the copolymer X can be selected from a wide variety of such monomers in accordance with the desired properties. Typical examples of such vinyl monomers are as follows.

(1) Esters of acrylic acid or methacrylic acid $C_l$ to $C_{18}$ alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_2$ to $C_{18}$ alkoxyalkyl esters of acrylic acid or methacrylic acid such as methoxybutyl acrylate, methoxybutyl methacrylate, methoxyethyl acrylate, methoxyethyl methacrylate, ethoxybutyl acrylate and ethoxybutyl methacrylate; $C_2$ to $C_8$ alkenyl esters of acrylic acid or methacrylic acid such as allyl acrylate and allyl methacrylate; $C_2$ to $C_8$ hydroxyalkyl esters of acrylic acid or methacrylic acid such as hydroxyethyl acrylate, hydroxyethyl methacrylate, hydroxypropyl acrylate and hydroxypropyl methacrylate; addition products of the above hydroxyalkyl esters of acrylic acid or methacrylic acid with polycaprolactone; and $C_3$ to $C_{18}$ alkenyloxyalkyl esters of acrylic acid or methacrylic acid such as allyloxyethyl acrylate and allyloxyethyl methacrylate.

(2) Vinyl aromatic compounds

Styrene, $\alpha$-methylstyrene, vinyltoluene and p-chlorostyrene.

(3) Polyolefinic compounds

Butadiene, isoprene and chloroprene.

(4) Others

Acrylonitrile, methacrylonitrile, methyl isopropenyl ketone, vinyl acetate, Veova monomer (product of Shell Chemical), vinyl propionate, vinyl pivalate, etc.

The other copolymer Y for use in the present composition as its resin component comprises as a monomer component thereof a polysiloxane macromonomer. This macromonomer has the main skeleton of siloxane bond having an aliphatic hydrocarbon group, phenyl, hydroxyl, alkoxyl, polymerizable unsaturated bond, etc. directly or indirectly attached to Si of the siloxane bond. The macromonomer can be obtained by reacting a compound (A) represented by the formula (II) with a compound (B) represented by the formula (III).

In the above formula (II) representing the compound (A), $R_6$ is an aliphatic hydrocarbon group having 1 to 8 carbon atoms or phenyl, and $R_7$, $R_8$ and $R_9$ are each alkoxyl having 1 to 4 carbon atoms or hydroxyl. $R_7$, $R_8$ and $R_9$ may all be the same or different, or at least one of them may be different from the others.

In the compound (A), examples of alkoxyl groups having 1 to 4 carbon atoms are straight-chain or branched groups such as methoxy, ethoxy, propoxy, butoxy and the like. Examples of aliphatic hydrocarbon groups having 1 to 8 carbon atoms are methyl, ethyl, propyl, butyl, pentyl, hexyl, heptyl, octyl and the like which are straight-chain or branched groups.

Methyl and phenyl are especially desirable as $R_6$ in the compound (A). Preferable as $R_7$, $R_8$ and $R_9$ are methoxy, ethoxy, propoxy, butoxy and hydroxyl. Examples of preferred compounds (A) are methyltrimethoxysilane, phenyltrimethoxysilane, butyltrimethoxysilane, methyltriethoxysilane, methyltributoxysilane, phenyltrisilanol, methyltrisilanol and the like, among which methyltrimethoxysilane, phenyltrimethoxysilane and phenyltrisilanol are especially desirable. These compounds can be used singly or in combination.

In the above compound (B), $R_{10}$ represents a hydrogen atom or methyl, and $R_{11}$, $R_{12}$ and $R_{13}$ are each hydroxyl, alkoxyl havibng 1 to 4 carbon atoms or an aliphatic hydrocarbon group having 1 to 8 carbon atoms. m is an integer of 1 to 6. $R_{11}$, $R_{12}$ and $R_{13}$ may all be the same or different, or at least one of them may be different from the others. However, at least one of them is hydroxyl or alkoxyl.

In the compound (B), examples of aliphatic hydrocarbon groups having 1 to 8 carbon atoms, as well as alkoxyl groups having 1 to 4 carbon atoms, can be those exemplified for the compound (A). Methoxy, ethoxy and hydroxyl groups are especially desirable as $R_{11}$, $R_{12}$ and $R_{13}$, and m is preferably in the range of from 2 to 4. Examples of preferable compounds (B) are β-acryloxyethyltriethoxysilane, β-methacryloxyethyltriethoxysilane, γmethacryloxypropyltrimethoxysilane, γmethacryloxypropyltriethoxysilane, γacryloxypropyltrimethoxysilane, γmethacryloxybutyltriethoxysilane, γacryloxypropyltrisilanol and the like. More preferable among these examples are β-acryloxyethyltriethoxysilane, β-methacryloxyethyltriethoxysilane, γ-melhaozyloxypropyltrimethoxysilane, γ-methacryloxypropyltriethoxysilane and γ-acryloxypropyltrisilanol. These compounds can be used singly or in combination.

According to the present invention, the polysiloxane macromonomer can be prepared by reacting the compound (A) with the compound (B). The proportions of the two compounds, based on the combined amount thereof, are about 70 to about 99.999 mole %, preferably about 90 to about 99.9 mole %, more preferably about 95 to about 99 mole %, of the compound (A), and about 30 to about 0.001 mole %, preferably about 10 to about 0.1 mole %, more preferably about 5 to about 1 mole %, of the compound (B). If the amount of the compound (A) is less than 70 mole %, the mixture is liable to gel during the copolymerization reaction, whereas if it is larger than 99.999 mole %, the amount of uncopolymerized polysiloxane increases to render the resin solution turbid, hence undesirable.

The reaction between the compounds (A) and (B) is effected by the dehydration condensation of the hydroxyl groups contained in these compounds and/or the hydroxyl groups resulting from the hydrolysis of the alkoxyl groups of the compounds. Depending on the reaction conditions, the reaction involves dealcoholization condensation in addition to the dehydration reaction.

Although the reaction can be carried out in the absence of solvent, it is desirable to conduct the reaction in water and/or an organic solvent wherein both the compounds (A) and (B) are soluble. Examples of desirable organic solvents are hydrocarbon solvents such as heptane, toluene, xylene, octane and mineral spirit, ester solvents such as ethyl acetate, n-butyl acetate, isobutyl acetate, methyl cellosolve acetate and butylcarbitol acetate, ketone solvents such as methyl ethyl ketone, methyl isobutyl ketone and diisobutyl ketone, alcoholic solvents such as ethanol, isopropanol, n-butanol, sec-butanol and isobutanol, ether solvents such as n-butyl ether, dioxane, ethylene glycol monomethyl ether and ethylene glycol monoethyl ether, and the like. These solvents are usable singly or in combination.

When the compounds (A) and (B) are used in the form of a solution, the combined concentration of these compounds in the solution is suitably at least about 5 wt. %.

According to the invention, the compounds (A) and (B) are reacted suitably at a temperature of about 20 to about 180° C., preferably about 50 to about 120° C. The reaction time is suitably about 1 to about 40 hours usually.

When required, the reaction may be carried out in the presence of a polymerization inhibitor, which is effective for preventing the polymerization reaction due to unsaturated bonds in the compound (B). Examples of useful inhibitors are hydroquinone, hydroquinone monomethyl ether and like quinone compounds.

The reaction system of compounds (A) and (B) for preparing the polysiloxane macromonomer may have incorporated therein tetraalkoxysilane, dialkyldialkoxysilane or the like, which can be used in an amount of up to about 20 mole % based on the combined amount of the compounds (A) and (B).

When $R_7$, $R_8$, $R_9$, $R_{11}$, $R_{12}$ and $R_{13}$ in the compounds (A) and (B) are all hydroxyl, it is desirable to conduct the reaction in an organic solvent with heating and stirring for dehydration condensation.

Further when at least one of the compounds (A) and (B) has alkoxyl attached to Si, it is desired to effect hydrolysis before condensation. The hydrolysis reaction and the condensation reaction can be carried out continuously in the presence of water and a catalyst with heating and stirring. The amount of water to be used for these reactions, although not limited specifically, is preferably at least about 0.1 mole per mole of alkoxyl. With less than about 0.1 mole of water present, the two compounds are likely to become lower in reactivity. It is most preferable to use a large excess of water. In the case where the condensation reaction produces an alcohol which is sparingly soluble in water, the use of water and a water-soluble organic solvent in combination serves to render the reaction system uniform. Desirable for use as water-soluble organic solvents are the aforementioned alcoholic, ester, ether and ketone solvents. Acids or alkali catalysts are usable as catalysts for the hydrolysis reaction. Examples of useful acid catalysts are hydrochloric acid, sulfuric acid, phosphoric acid, formic acid, acetic acid, propionic acid, acrylic acid, methacrylic acid and the like. Examples of useful alkali catalysts are sodium hydroxide, triethylamine, ammonia and the like. It is suitable to use the catalyst in an amount of about 0.0001 to about 5 wt. %, preferably about 0.01 to about 0.1 wt. %, based on the combined amount of the compounds (A) and (B).

The polysiloxane macromonomer to be used in this invention is about 400 to about 100,000, preferably about 1,000 to about 20,000, in number average molecular weight. If this value is less than about 400, the copolymerization reaction system tends to gel, whereas values exceeding about 100,000 is likely to result in impaired compatibility, hence undesirable.

The main skeleton of the polysiloxane macromonomer afforded by the reaction of the compounds (A) and (B) in the present invention comprises a siloxane bond. The main skeleton primarily has a linear structure, ladder structure or a structure in the form of a combination of these structures. It is desirable to use a macromonomer of ladder structure, or a macromonomer of combination structure having a larger proportion of ladder structure, from the viewpoint of resistance to water, heat and light. The structure of the macromonomer can be selectively determined as desired according to the ratio between the compound (A) and the compound (B), the amounts of water and acid catalyst, etc. The polysiloxane macromonomer has a structure wherein the Si of the siloxane bond has attached thereto groups such as $R_6$ and $R_7$ to $R_9$ of the formula (II), a group of the formula

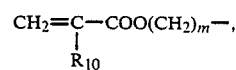

and $R_{11}$ to $R_{13}$ of the formula (III). The macromonomer has as attached to the Si at least two free functions groups per molecule such as hydroxyl and alkoxyl having 1 to 4 carbon atoms (i.e., silanol group and/or alkoxysilane group).

It is further desired that the polysiloxane macromonomer have on the average about 0.2 to about 1.9, preferably about 0.6 to about 1.4, more preferably about 0.9 to about 1.2, polymerizable unsaturated bonds per molecule. With a very small quantity of polymerizable unsaturated bonds present, the copolymerization reaction product is liable to become turbid, whereas when having an excess of such bonds, the macromonomer is likely to gel during the reaction, hence undesirable.

The number of unsaturated bonds in the macromonomer can be determined by the following method. (1) Various polysiloxane macromonomers are prepared by reacting the compound (A) with the compound (B) in suitably varying ratios. (2) A nonfunctional vinyl monomer is reacted with the macromonomer in varying ratios to obtain various vinyl copolymers. The nonfuctional vinyl monomer to be used is a vinyl monomer which has a polymerizable unsaturated bond portion as a portion reactive with the unsaturated bond in the macromonomer and which has no functional group reactive with the alkoxysilane group and/or the silanol group in the macromonomer. Examples of nonfunctional vinyl monomers which can be used are styrene, vinyltoluene, an ester of acrylic acid or methacrylic acid with a monovalent alcohol, and the like. (3) The molecular weight distributions of the resulting vinyl copolymers are determined by gel permeation chromatography (G.P.C.). (4) When the copolymers obtained using the macromonomer and the nonfunctional vinyl monomer in varying ratios are approximately identical in peak molecular weight (molecular weight for the highest content) and have a distribution curves with a single peak, free from low-molecular-weight components (macromonomers free from unsaturated bond) or high-molecular-weight components (copolymers of macromonomers having at least two unsaturated bonds), the macromonomer used can then be interpreted as having one polymerizable unsaturated bond per molecule on the average. (5) The average number of polymerizable unsaturated bonds in the other macromonomers can be given by $$\frac{[B]/[A]}{[B_1]/[A_1]}$$

wherein [A] is the mole number of the compound (A) used, [B] is the mole number of the compound (B) used, and [$A_1$] and [$B_1$] are the mole numbers of the compound (A) and the compound (B), respectively, used for giving the macromonomer having one polymerizable unsaturated bond on the average.

For example, it is assumed the molar ratio of compound (B)/compound (A) =1/20 affords a macromonomer having one polymerizable unsaturated bond. The molar ratio of compound (B)/compound (A) =0.9/20 then gives a macromonomer having 0.9 polymerizable unsaturated bond on the average.

The other monomer of the copolymer Y for use in the invention is an oxirane-containing vinyl monomer. Examples of such monomers are glycidyl-containing monomers including glycidyl methacrylate, glycidyl acrylate and vinyl glycidyl ether, alicyclic oxirane-containing monomers of the formulae given below, the monomers of the formula (IV) to (XV), etc.

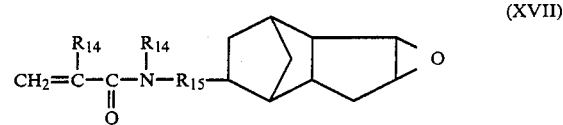 (XVII)

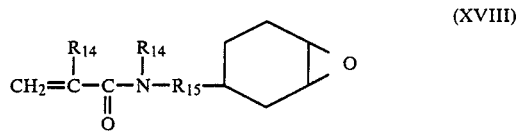 (XVIII)

wherein $R_{14}$ and $R_{15}$ are as defined above.

Of these oxirane-containing vinyl monomers, glycidyl-containing monomers are desirable since they are readily available and less costly, while, alicyclic oxirane-containing monomers are suitable from the viewpoint of the curability of the composition.

The polysiloxane macromonomer and the oxirane-containing vinyl monomer are used as monomer components to give a vinyl copolymer for use as the copolymer Y of the present resin composition. When required, polymerizable vinyl monomers other than these monomers are usable as monomer components of the copolymer Y. Such a polymerizable vinyl monomer can be selected from among a wide variety of monomers in accordance with the desired properties. Typical of these unsaturated monomers are the monomers (1) to (4) given above.

The monomers for preparing the copolymer Y to be used for the resin composition of the invention are used in the following amounts. When the copolymer is composed of two components, i.e. polysiloxane macromonomer and oxirane-containing vinyl monomer, about 0.01 to about 98 wt. % of the former and about 99.99 to about 2 wt. % of the latter, preferably about 0.1 to about 80 wt. % of the former and about 99.9 to about 20 wt. % of the latter, are used. If the amount of polysiloxane macromonomer used is smaller than this range, reduced curability tends to result, whereas amounts exceeding this range are undesirable since the cured product then exhibits impaired properties and is liable to shrinkage.

Further when other polymerizable vinyl monomer is used in addition to the above two kinds of monomers, about 0.01 to about 80 wt. % of polysiloxane macromonomer, about 1 to about 90 wt. % of oxirane-containing vinyl monomer and up to about 98.99 wt. % of other polymerizable vinyl monomer are used. More preferably, about 0.1 to about 60 wt. % of polysiloxane macromonomer, about 3 to about 60 wt. % of oxirane-containing vinyl monomer and about 10 to about 96.9 wt. % of other polymerizable vinyl monomer are used. It is undesirable to use the macromonomer and the oxirane-containing vinyl monomer in amounts outside the above ranges for the same reasons as give above.

The copolymer can be prepared by the same process and under the same conditions as usually used for preparing acrylic resins or vinyl resins. For example, the copolymer can be prepared by dissolving or dispersing the monomer components in an organic solvent and heating the solution or dispersion at a temperature of about 60 to about 180° C. with stirring in the presence of a radical polymerization initiator. The reaction is conducted usually for about 1 to about 10 hours. Examples of useful organic solvents are those exemplified already, including alcohol solvents, ether solvents, ester solvents, hydrocarbon solvents and the like. The hydrocarbon solvent, when to be used, is used preferably in combination with other solvents in view of solubility. The radical polymerization initiator can be any of those generally used. Examples of such initiators are benzoyl peroxide, t-butylperoxy-2-ethyl hexanoate and like peroxides, azoisobutyronitrile, azobisdimethylvaleronitrile and like azo compounds.

It is desired that the copolymer Y be about 2,000 to about 200,000, preferably about 10,000 to about 80,000 in number average molecular weight. If the molecular weight is less than 2,000, lower curability will result, whereas if it is over 200,000, the copolymer exhibits impaired compatibility with oxirane-containing compounds and affords a composition which is not applicable efficiently.

With the present invention, the copolymer X and the copolymer Y can be used singly, or at least two of such copolymers can be used in admixture.

The resin composition of the present invention is prepared by admixing with the copolymer X and/or the copolymer Y a chelate compound serving as a crosslinking curing agent, and a compound having a number average molecular weight of up to about 1,000 and containing at least two alicyclic oxirane groups in the molecule as a reactive diluent.

The chelate compounds for use in the invention are preferably aluminum chelate compounds, titanium chelate compounds and zirconium chelate compounds. Of these chelate compounds, more preferable are those containing a compound capable of forming a keto-enol tautomer, as ligands forming a stable chelate ring.

Examples of useful compounds capable of forming a keto-enol tautomer are β-diketones (such as acetylacetone), acetoacetic acid esters (such as methyl acetoacetate), malonic esters (such as ethyl malonate), ketones having hydroxyl in the β-position (such as diacetone alcohol), aldehydes having hydroxyl in the β-position (such as salicylaldehyde), esters having hydroxyl in the β-position (such as methyl salicylate), etc. Especially preferred results can be achieved when acetoacetates and β-diketones are used.

The aluminum chelate compound can be prepared advantageously, for example, by admixing the compound capable of forming a keto-enol tautomer with an aluminum alcoholate represented by the formula

(XIX)

wherein $R_{17}$ is alkyl having 1 to 20 carbon atoms or alkenyl and the $R_{17}$ groups are the same or different, usually in the ratio of up to about 3 moles of the former per mole of the latter, and heating the mixture when required.

Examples of alkyl groups having 1 to 20 carbon atoms are the aforementioned alkyl groups having 1 to 10 carbon atoms, undecyl, dodecyl, tridecyl, tetradecyl, octadecyl and the like. Examples of alkenyl groups are vinyl, allyl and the like.

Examples of aluminum alcoholates represented by the formula (XIX) are aluminum trimethoxide, aluminum triethoxide, aluminum tri-n-propoxide, aluminum triisopropoxide, aluminum tri-n-butoxide, aluminum triisobutoxide, aluminum tri-sec-butoxide, aluminum tri-tert-butoxide, etc. It is especially desirable to use aluminum triisopropoxide, aluminum tri-sec-butoxide and aluminum tri-n-butoxide.

The titanium chelate compound can be prepared advantageously, for example, by admixing the compound capable of forming a keto-enol tautomer with a titanate represented by the formula

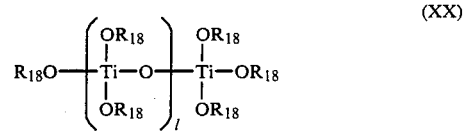

(XX)

wherein $l$ is an integer of 0 to 10, and $R_{18}$ is alkyl having 1 to 20 carbon atoms or alkenyl and the $R_{18}$ groups are the same or different, usually in the ratio of up to about 4 moles of the former per mole of the Ti in the titanate, followed by heating when required. Examples of alkyl groups having 1 to 20 carbon atoms and alkenyl groups are the same as those given above.

Examples of titanates represented by the formula (XX) wherein $l$ is 0 are tetramethyl titanate, tetraethyl titanate, tetra-n-propyl titanate, tetraisopropyl titanate, tetra-n-butyl titanate, tetraisobutyl titanate, tetra-tert-butyl titanate, tetra-n-pentyl titanate, tetra-n-hexyl titanate, tetraisooctyl titanate, tetra-n-lauryl titanate and the like. Favorable results can be obtained by using tetraisopropyl titanate, tetra-n-butyl titanate, tetraisobutyl titanate and tetra-tert-butyl titanate. Of the titanates wherein $l$ is 1 or greater, the dimers to hendecamers ($l=1$ to 10 in the formula (XX)) of tetraisopropyl titanate, tetra-n-butyl titanate, tetraisobutyl titanate and tetra-tert-butyl titanate achieve good results.

The zirconium chelate compound can be prepared favorably, for example, by admixing the compound capable of forming a keto-enol tautomer with a zirconate represented by the formula

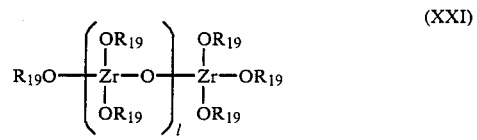

(XXI)

wherein $l$ is an integer of 0 to 10, and $R_{19}$ is alkyl having 1 to 20 carbon atoms or alkenyl and the $R_{19}$ groups are the same or different, usually in the ratio of up to about 4 moles of the former per mole of the Zr in the zirconate, followed by heating when required. Examples of alkyl groups with 1 to 20 carbon atoms and alkenyl groups are the same as those exemplified above.

Examples of zirconates represented by the formula (XXI) wherein $l$ is 0 are tetraethyl zirconate, tetra-n-propyl zirconate, tetraisopropyl zirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate and the like. Especially good result can be obtained with use of tetraisopropyl zirconate, tetra-n-propyl zirconate, tetraisobutyl zirconate, tetra-n-butyl zirconate, tetra-sec-butyl zirconate and tetra-tert-butyl zirconate. Of the zirconates wherein $l$ is 1 or greater, the dimers to hendecamers ($l=1$ to 10 in the formula (XXI)) of tetraisopropyl zirconate, tetra-n-propyl zirconate, tetra-n-butyl zirconate, tetraisobutyl zirconate, tetra-sec-butyl zirconate and tetra-tert-butyl zirconate give good results.

The chelate compound may contain structural units wherein such zirconates are associated with each other.

Examples of especially preferred chelate compounds for use in the invention are aluminum chelate compounds such as diisopropoxy ethylacetoacetate aluminum, tris(ethylacetoacetate)aluminum, tris(n-propylacetoacetate)aluminum, tris(isopropylacetoacetate)aluminum, tris(n-butylacetoacetate)aluminum, isopropoxy bis(ethylacetoacetate)aluminum, isopropoxy bis(propionylacetonato)aluminum, tris(acetylacetonato)aluminum, tris(-propylacetoacetate)aluminum, tris(propionylacetonato)aluminum, acetylacetonato-bis(ethylacetoacetate)aluminum, ethylacetoacetate bis(acetylacetonato)aluminum, tris(isopropionylacetonato)aluminum, tris(sec-butyrylacetonato)aluminum, [bis(isopropionylacetonato) sec-butyrylacetonato]aluminum and tris(-butylacetoacetate)aluminum; titanium chelate compounds such as diisopropoxy-bis(ethylacetoacetate)titanate, diisopropoxy-bis(acetylacetonato)titanate and isopropoxytris(propionylacetonato)titanate; and zirconium chelate compounds such as tetrakis(acetylacetonato)zirconium, tetrakis(n-propylacetoacetate)zirconium, tetrakis(propionylacetonato)zirconium and tetrakis(ethylacetoacetate)zirconium.

According to the present invention, one of the aluminum chelate compound, zirconium chelate compound and titanium chelate compound may be used, or at least two of these compounds may be used in a suitable combination. Among these chelate compounds, it is desirable to use the aluminum chelate compound and/or the zirconium chelate compound because these compounds have the advantage of assuring high curability and giving a cured product of diminished coloration. It is suitable to use the chelate compound in an amount of about 0.01 to about 30 parts by weight per 100 parts by weight of the combined amount of the copolymer component (a) (calculated as solids) and the compound of component (c). Amounts outside this range is not desirable; smaller amounts tend to result in lower crosslinking curability, whereas when used in larger amounts, the chelate compound remains in the cured product and tends to result in lower water resistance. The amount is preferably about 0.1 to about 10 parts by weight, more preferably about 1 to about 5 parts by weight.

Examples of compounds having a number average molecular weight of up to about 1,000 and containing at least two alicyclic oxirane groups in the molecule for use as the component (c) according to the invention are those represented by the following formulae.

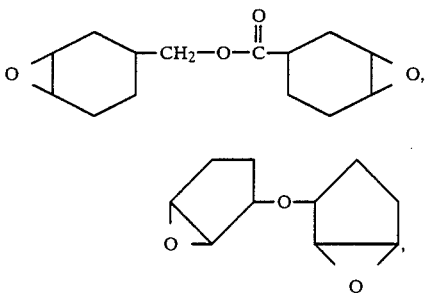

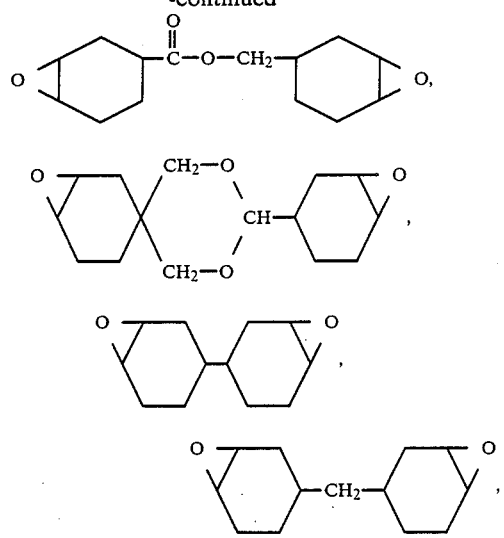

etc; adduct of

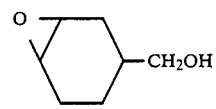

with a polyisocyanate; adduct of

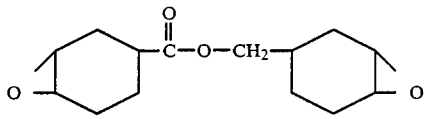

with a polybasic acid; product prepared from an ester having

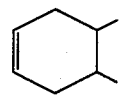

or like unsaturated group in the molecule by oxidizing the ester with peracetic acid or the like; etc. Examples of useful polyisocyanates are organic diisocyanates including aliphatic diisocyanates such as hexamethylene diisocyanate and trimethylhexamethylene diisocyanate, alicyclic diisocyanates such as xylylene diisocyanate and isophorone diisocyanate, aromatic diisocyanates such as tolylene diisocyanate and 4,4'-diphenylmethane diisocyanate. Also useful are adducts of these organic diisocyanates with a polyhydric alcohol, low-molecular-weight polyester resin, water or the like, polymers of these organic diisocyanates, isocyanate-buret compounds, etc. Commercially available as typical examples of such compounds are "BURNOCK D-750 and -800, DN-950 and -970, and 15-455" (products of Dainippon Ink & Chemicals Inc.), "DESMODUL L, NHL, IL and N3390" (products of Bayer, West Germany), "TAKENATE D-102, -202, -110N and -123N" (products of Takeda Chemical Industries, Ltd.), "COLONATE L, HL, EH and 203" (products of Nippon Polyurethane Kogyo Co., Ltd.), "DURANATE 24A-90CX" (product of Asahi Chemical Industry Co., Ltd.), etc. Examples of esters having an unsaturated group are obtained by esterifying, for example, tetrahydrophthalic anhydride, trimethylolpropane or 1,4-butanediol.

Also usable as compounds having alicyclic oxirane groups are those having introduced therein oxirane groups, other than the alicyclic oxirane group, as required.

It is important that the compound having at least two alicyclic oxirane groups in the molecule be up to about 1,000 in number average molecular weight. When greater than 1,000 in the molecular weight, the compound is less compatible with the copolymer used conjointly therewith, failing to give coatings which are excellent in finish and properties.

The alicyclic oxirane-containing compound is used in an amount of about 0.1 to about 1,000 parts by weight, preferably about 5 to about 100 parts by weight, per 100 parts by weight of the copolymer component (a). When the amount is less than 0.1 part by weight, the content of alicyclic oxirane groups which serve the important function of promoting curing decreases to result in lower curability. Further because the alicyclic oxirane-containing compound acts like a reactive diluent, contributing to an increase in the solids concentration of the composition, it is desirable to use at least 0.1 part by weight of the compound. On the other hand, when used in an amount greater than 1,000 parts by weight, the compound remains unreacted in an increased amount in the cured product obtained, giving impaired properties, weather resistance, etc. to the product.

When the alicyclic oxirane-containing compound is used in combination with the copolymer component of the present composition which comprises as a monomer component thereof a vinyl monomer containing an alicyclic oxirane group, the composition exhibits very high curability as already stated, whereas the use of the alicyclic oxirane-containing monomer which is presently costly is economically disadvantageous. When a composition of reduced cost is required, therefore, it is favorable to use a copolymer comprising a vinyl monomer containing an oxirane group other than the alicyclic one, since the composition then obtained is usable without entailing impairment of properties.

When required, extender pigments, coloring pigments, dyes, etc. can be incorporated into the curable composition of the invention. Further when required, it is also possible to incorporated into the composition monofunctional or polyfunctional epoxy compounds, low-molecular-weight silane compounds such as triphenylmethoxysilane and diphenyldimethoxysilane, epoxy-containing resins such as Epikote 1001 (product of Shell Chemical), hydroxyl-containing resins such as styreneallyl alcohol copolymer, common alkoxysilane-containing silicone resins, etc. These resins are used preferably in an amount of up to about 10 wt. % based on the composition. Further to give improved storage stability, it is possible to added to the composition compounds providing ligands for the chelate compound, such as the aforementioned compounds capable of forming a keto-enol tautomer.

The present resin composition may be used in the form of a solution in an organic solvent as prepared in advance or immediatetly before use. Although not limitative, preferred organic solvents are those up to about 150° C. in boiling point in view of the curing velocity of the composition. Examples of preferable organic solvents are hydrocarbon solvents such as toluene and xylene, ketone solvents such as methyl ethyl ketone and methyl isobutyl ketone, ester solvents such as ethyl acetate and butyl acetate, ether solvents such as dioxane and ethylene glycol diethyl ether, alcoholic solvents such as butanol and propanol, etc. These solvents can be used singly or in a suitable combination. When alcoholic solvents are used, it is desirable to use them in combination with other solvent in view of the solubility of the resin. The resin content in the resin solution, although variable according to the contemplated use, is generally about 10 to about 70 wt. %.

The method of applying the present resin composition is not limited specifically but can be any of usual coating methods such as spray coating, roll coating and brush coating.

The resin composition of the present invention, when incorporating the copolymer Y, is readily curable through crosslinking at low temperatures of up to about 100° C. For example, the composition can be fully cured at room temperature without any heating usually in about 8 hours to about 7 days. When heated at about 40 to about 100° C., the composition can be completely cured in about 5 minutes to about 3 hours.

The curing reaction of the present composition starts with the evaporation of the solvent and is thought to proceed in the fashion of a chain reaction by virtue of the vaporization of the chelating agent from the crosslinking agent. Presumably, the crosslinking agent causes the reaction to proceed through the following mechanism. For example, when the crosslinking curing agent used is an aluminum chelate compound, the vaporization of the chelting agent is followed by the reaction of the aluminum compound with the silanol group derived from the polysiloxane macromonomer to produce the bond

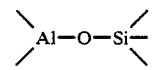

in the first stage.

Subsequently in the second stage, a coordination bond is formed between silanol and

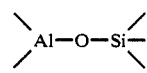

in the form of

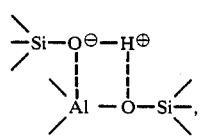

whereby the silanol is polarized. The polarized silanol reacts with an oxirane group, forming an oxonium salt as represented by

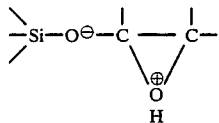

Subsequently, the ionic polymerization of oxirane groups and the addition reaction thereof with hydroxyl groups occur.

In the case of the present resin composition, the vinyl copolymer, the resin component thereof, contains silanol groups derived from the polysiloxane macromonomer and oxirane groups derived from the alicyclic oxirane-containing vinyl monomer. Accordingly, besides the crosslinking reaction catalytically effected by the crosslinking curing agent as stated above, presumably various curing reactions take place concurrently, as given below.

(A) Condensation of silanol groups
(B) Condensation of silanol groups with hydroxyl groups from oxirane groups.
(C) Addition of silanol groups to oxirane groups.
(D) Addition of hydroxyl groups to oxirane groups.
(E) Ion polymerization of oxirane groups.

With these curing reactions occurring concurrently, the resin composition can be cured at the surface and in the interior almost at the same time. This diminishes the difference in the degree of curing between the surface and the interior of the cured product, which therefore has sufficient hardness and is almost free of shrinkage.

When the polysiloxane macromonomer in the present composition contains alkoxyl groups which form alkoxysilane groups, the composition requires hydrolysis to form silanol groups. This hydrolysis reaction proceeds satisfactorily in the presence of a small amount of water, e.g. the moisture of air. The hydrolysis reaction will not readily proceed in the interior of the composition, and if the macromonomer has no silanol group, it is difficult to effect in the interior of the composition the curing reaction wherein the silanol group participates, whereas the interior portion can be fully cured by the reaction wherein epoxy groups participates.

The resin composition of the present invention, when incorporating the copolymer X, is easily curable by crosslinking at low temperatures in the presence of water. More specifically, the composition of the invention can be fully cured usually in about 8 hours to about 7 days without necessitating any heating, merely by adding water to the composition and thereafter applying the composition, or by applying the composition and exposing the coating to air. Alternatively when heated, for example, at about 40 to about 100° C., the composition is curable in about 5 minutes to about 3 hours. The water needed for curing is in such a small amount as the moisture content of air. When water is added to the composition before application, about 0.1 to about 1 wt. % of water usually produces a satisfactory result.

The resin composition of the present invention is readily curable through crosslinking at a low temperature in the presence of a small quantity of water, presumably for the following reason. When the aluminum chelate compound is present, the alkoxyl groups derived from the monomer A hydrolyzes in the first stage in the presence of water under the catalytic action of the aluminum chelate compound to produce silanol groups. In the second stage et seq., the same reactions as already stated proceed.

The conventional curable resin composition of the same type as the present composition cures through the second-stage reaction only, whereas the monomer B and the alicyclic oxirane-containing compound present in the present composition permit the second-stage reaction and the third-stage reaction to proceed concurrently in a chainlike fashion, whereby the composition is crosslinked and cured. Presumably for this reason, the present composition is favorably curable at a low temperature in the presence of a small amount of water.

The resin composition of the invention has the outstanding features given below.

(1) The composition can be readily cured by crosslinking at low temperatures of up to 100° C. For example, when cured at 80° C. for 30 minutes, the composition gives a cured product having a gel fraction of at least 95%.

(2) The curing reaction requires no water or proceeds in the presence of a small quantity of water, e.g. the moisture in air. (3) The composition starts curing with the vaporization of the solvent, so that the composition, when prepared as a single-package composition, can be stored with good stability. For example, the composition remains stable for at least 1 year when free from water.

(4) The composition is free from any curing agent, such as isocyanate, which is highly toxic.

(5) The composition is in the form of a solution having a low viscosity and therefore has a high solids concentration.

(6) The condensation reaction of silanol groups, the ion polymerization reaction of epoxy groups and other curing reactions occur concurrently, consequently diminishing the difference in the degree of curing between the surface and the interior, causing no shrinkage and rendering the composition satisfactorily usable for producing coatings of increased thickness.

(7) The composition affords cured products which are excellent in properties, especially in resistance to weather, water and impact, flexibility, resistance to staining or soiling, etc. because of reduced amounts of alcohol and other by-products.

(8) The composition has little or no likelihood of remaining uncured in the surface layer when cured, is excellent in overcoatability and recoatability and provides cured products which are outstanding in adhesion etc.

The resin composition of the invention is usable, for example, as a coating composition, adhesive, ink, etc. The cured product of the invention is outstanding in weather resistance, water resistance, etc., so that the composition is suited for use in coating or repairing motor vehicles and containers, in coating outdoor building materials and in preparing precoated metals (PCM) and the like.

The present invention will be described in greater detail with reference to the following examples and comparative examples.

Preparation of vinyl copolymer solution A

A vinyl copolymer solution A of the following monomer composition was prepared.

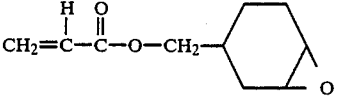

| | |
|---|---|
| n-Butyl methacrylate | 30.5 g |

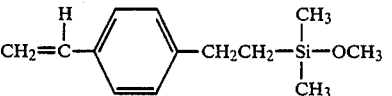

The copolymer solution obtained, containing 50 wt. % of toluene, had a viscosity of H (Gardner viscosity at 25° C., the same as hereinafter) and a number average molecular weight of 7,500.

Preparation of vinyl copolymer solution B

A vinyl copolymer solution B having the following monomer composition was prepared.

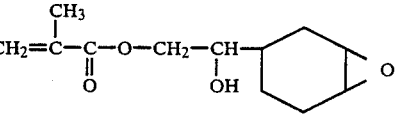

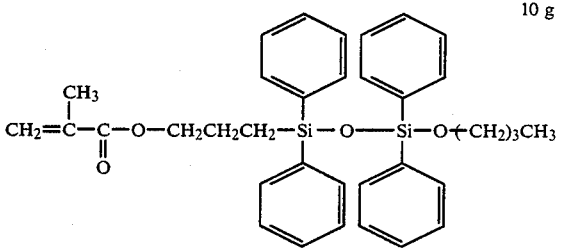

The copolymer solution obtained, containing 30 wt. % of isobutyl acetate, was Z in viscosity and 3,000 in number average molecular weight.

Preparation of vinyl copolymer solution C

A vinyl copolymer solution C having the following monomer composition was prepared.

| | |
|---|---|
| Oxydicyclopentenyl acrylate | 20.5 g |
| Styrene | 40.5 g |
| n-Butyl acrylate | 29.0 g |
| γ-Methacryloxypropyl-methyldimethoxysilane | 10.0 g |

The vinyl copolymer solution obtained, containing 50 wt. % of tolulene, had a viscosity of X and a number average molecular weight of 18,000.

Preparation of vinyl copolymer solution D

A vinyl copolymer solution D having the following monomer composition was prepared.

| | |
|---|---|
| Glycidyl methacrylate | 30 g |
| γ-Methacryloxypropyl-trimethoxysilane | 10 g |
| n-Butyl methacrylate | 25 g |
| 2-Ethylhexyl methacrylate | 15 g |
| 2-Hydroxyethyl methacrylate | 10 g |
| Styrene | 10 g |

The vinyl copolymer solution obtained, containing 50 wt. % of toluene, was H in viscosity and 10,000 in number average molecular weight.

EXAMPLES 1 to 6

Each clear composition listed in Table 1 was adjusted to a viscosity of Ford cup #4, 45 seconds (20° C.) and then applied to panels by an applicator to such a thickness that the resulting coating was 60 micrometers when dried. The coated panels were baked at 80° C. for 30 minutes for curing. The panels thus coated were soft steel panels, glass panels and aluminum panels for conducting different tests.

COMPARATIVE EXAMPLE 1

A composition was prepared in exactly the same manner as in Example 1 except that the alicyclic oxirane-containing compound (1) was not used.

COMPARATIVE EXAMPLE 2

A composition was prepared in exactly the same manner as in Example 4 except that the alicyclic oxirane-containing compound (2) was not used.

COMPARATIVE EXAMPLE 3

A vinyl copolymer was prepared with the following monomer composition.

| | |
|---|---|
| n-Butyl methacrylate | 95.0 g |
| γ-Methacryloxypropyl-trimethoxysilane | 5.0 g |

A 50 wt. % toluene solution of this copolymer had a Gardner viscosity of N and a peak molecular weight of 28,000. A comparative curable composition was prepared by adding 2 g of tris(acetylacetonato)aluminum to 100 g of the toluene solution.

COMPARATIVE EXAMPLE 4

A composition was prepared in the same manner as in Example 1 except that the following compound was not used.

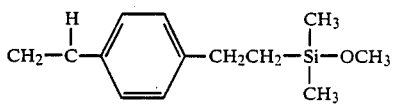

The compositions of Comparative Examples 1 to 4 were adjusted in viscosity in the same manner as in Examples 1 to 6, applied to panels and cured by baking in the same manner as in Examples 1 to 6.

Table 2 shows the solids concentrations of the compositions of Examples and Comparative Examples and the properties of the coatings thereof.

TABLE 1

| | Example No. | | | | | |
|---|---|---|---|---|---|---|
| | 1 | 2 | 3 | 4 | 5 | 6 |
| Vinyl copolymer solution A | 100* | | | | 100* | 100* |
| Vinyl copolymer solution B | | 100* | | | | |
| Vinyl copolymer solution C | | | 100* | | | |
| Vinyl copolymer solution D | | | | 100* | | |
| Tris(n-propylaceto- | 2 | | 2 | 2 | 2 | |

TABLE 1-continued

| | Example No. | | | | | |
|---|---|---|---|---|---|---|
| | 1 | 2 | 3 | 4 | 5 | 6 |
| acetate)aluminum | | | | | | |
| Tris(acetylacetonato)-aluminum | | 2 | | | | |
| Tetrakis(n-propylacetoacetate)zirconium | | | | | | 2 |
| Alicyclic oxirane-containing compound | | | | | | |
| (1) | 15 | 15 | 20 | | | 15 |
| (2) | | | | 30 | 20 | |

Alicyclic oxirane-containing compound (1)

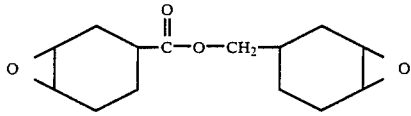

(2)

Adduct of 2 moles of hexamethylene diisocyanate with 1 mole of having a number average molecular weight of 392.

*gram of vinyl copolymer solid.

Property tests

*Gel fraction ratio: The dried coating on the glass panel as separated therefrom was subjected to extraction with acetone at the reflux temperature for 6 hours using a Soxhlet extractor, and thereafter checked for the ratio of the residue (%).

*Impact resistance: A 500-grm weight was dropped onto the coated surface of the soft steel panel using a Du Pont impact tester to determine a maximum distance of fall (cm) at which the coating remained free of cracking or scaling.

*Water resistance: The coated soft steel panel was immersed in hot water (40° C.) for 60 days and thereafter checked for changes in the coating.

*Weather resistance: The coating on the aluminum panel was subjected to the cycle of irradiation with light at a temperature of 40 to 70° C. (for 15 minutes) and condenstion (15 minutes) repeatedly for 2,000 hours using a QUV weather meter (product of the Q Panel Company, UV fluorescent lamp "No. QFS-40. UV-B," wavelength range 320-280 nm), and was checked for the deterioration of the coating.

TABLE 2

| | Example | | | | | |
|---|---|---|---|---|---|---|
| | 1 | 2 | 3 | 4 | 5 | 6 |
| State of coating | Good | Good | Good | Good | Good | Good |
| Gel fraction ratio | 98.5 | 99.0 | 98.5 | 97.5 | 99.0 | 98.0 |
| Impact resistance | 50< | 50< | 50< | 50< | 50< | 50< |
| Water resistance | Good | Good | Good | Good | Good | Good |
| Weather resistance | Good | Good | Good | Good | Good | Good |
| Solids content after viscosity adjustment (wt. %) | 63 | 65 | 60 | 61 | 61 | 63 |

| | Comparative Example | | | |
|---|---|---|---|---|
| | 1 | 2 | 3 | 4 |
| State of coating | Good | Good | Shrinkage | Uncured |
| Gel fraction ratio | 98.4 | 63.2 | 35.2 | Uncured |
| Impact resistance | 50< | 20 | 10> | Uncured |
| Water resistance | Good | Blushing, blistering | Blushing, blistering | Uncured |
| Weather resistance | Good | Dulling | Dulling | Uncured |
| Solids content after viscosity adjustment (wt. %) | 55 | 54 | 56 | 61 |

EXAMPLE 7

| Methyltrimethoxysilane | 2720 g (20 mols) |
|---|---|
| γ-Methacryloxypropyltrimethoxysilane | 256 g (1 mol) |
| Deionized water | 1134 g |
| 60% Hydrochloric acid | 2 g |
| Hydroquinone | 1 g |

The mixture of these compounds was reacted at 80° C. for 5 hours, and the resulting polysiloxane macromonomer was 2,000 in number average molecular weight and had one vinyl group (polymerizable unsaturated bond) and four hydroxyl groups per molecule on the average.

The macromonomer (300 g) was mixed with the following compounds.

| Styrene | 100 g |
|---|---|
| Glycidyl methacrylate | 200 g |
| n-Butyl acrylate | 400 g |
| Azobisisobutyronitrile | 20 g |

The above mixture was added dropwise to 1,000 g of xylene at 120° C. for polymerization, giving a transparent polymer, which was about 20,000 in number average molecular weight.

To 140 g of the copolymer solution were added 30 g of

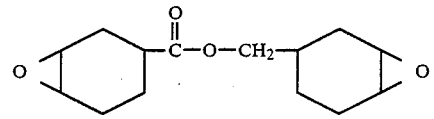

and tris(ethylacetoacetate)aluminum. The mixture was applied to a glass panel to a dry thickness of 60 μ and baked at 90° C. for 30 minutes, giving a smooth-surfaced transparent coating free of shrinkage. When subjected to extraction with acetone, the residue was

EXAMPLE 8

| Phenyltrisilanol | 7800 g (50 mols) |
|---|---|
| γ-Acryloxypropyltrisilanol | 200 g (1 mol) |
| Toluene | 4500 g |

The mixture was reacted at 117° C. for 3 hours and dehydrated. The polysiloxane macromonomer obtained was 7,000 in number average molecular weight and had one vinyl group and 5 to 10 hydroxyl groups per molecule on the The following compounds were added to 100 g of the macromonomer.

| 2-Hydroxyethyl acrylate | 100 g |
|---|---|
| $CH_2=C(CH_3)-C(=O)-O-CH_2-$ [cyclohexene oxide] | 200 g |
| 2-Ethylhexyl methacrylate | 600 g |
| Azobisisobutyronitrile | 10 g |

The mixture was added dropwise to 1000 g of butanol-xylene mixture (1:1 by weight) at 120° C. for polymerization to obtain a transparent copolymer, which was about 40,000 in number average molecular weight.

To 160 g of the copolymer solution were added 40 g of

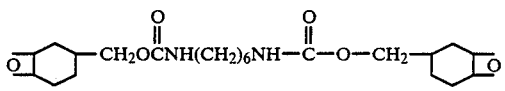

and 0.3 g of tetrakis(acetylacetonato)zirconium. The mixture was applied to a glass panel to a dry thickness of 60 μ and baked at 80° C. for 30 minutes. When cured, the coating was smooth-surfaced, transparent and free of shrinkage. The acetone extraction residue was 98.4%.

EXAMPLE 9

Phenyltrimethoxysilane (48 mols) was reacted with 2 mols of β-methacryloxyethyltriethoxysilane in the same manner as in Example 7, giving a polysiloxane macromonomer, which was about 5,000 in number average molecular weight and had one vinyl group and 5 to 10 methoxy groups per molecule on the average. In the same manner as in Example 7, 500 g of this macromonomer was polymerized with 500 g of the same vinyl monomer as used in Example 7, giving a copolymer having a number average molecular weight of about 60,000.

To 100 g of the copolymer solution were added 50 g of the adduct of 1 mol of adipic acid with 2 mols of

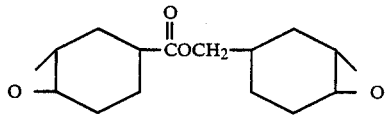

and 1.0 g of tris(acetylacetonato)aluminum The mixture was applied to a glass panel to a dry thickness of 60 μ and baked at 100° C. for 30 minutes. When cured, the coating was smooth-surfaced, transparent and free of shrinkage. The acetone extraction residue was 95.1%.

EXAMPLE 10

Methyltrimethoxysilane (29.1 mols) was reacted with 0.9 mol of β-acryloxyethyltriethoxysilane in the same manner as in Example 7. The resulting polysiloxane macromonomer was about 15,000 in number average molecular weight and had one vinyl group and 5 to 10 methoxy groups per molecule on the average.

This macromonomer (400 g) was polymerized with 600 g of the same vinyl monomer as used in Example 7 to obtain a copolymer, which was about 70,000 in number average molecular weight.

Tetrakis(ethylacetoacetate)zirconium (10 g) was admixed with a mixture of 180 g of the copolymer solution and 10 g of

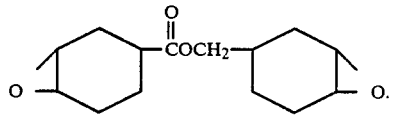

The resulting mixture was applied to a glass panel to a thickness of 60 μ and baked at 80° C. for 30 minutes.

The cured coating was transparent and free of shrinkage. The acetone extraction residue was 93.5%.

EXAMPLE 11

The curable composition of Example 8 was applied to a glass panel to a dry thickness of 60 μ and allowed to stand at 25° C. for 48 hours.

When cured, the coating was smooth-surfaced, transparent and free of shrinkage. The acetone extraction residue was 93.3%.

We claim:

1. A resin composition curable at a low temperature and characterized in that the composition comprises:
   (a) at least one copolymer selected from the group consisting of a copolymer X which is prepared from a monomer mixture comprising an oxirane-containing vinyl monomer and an alkoxysilane-containing vinyl monomer represented by the formula

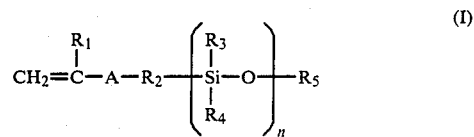

(I)

wherein A is

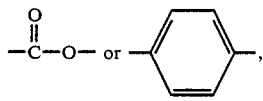

$R_1$ is a hydrogen atom or methyl, $R_2$ is a bivalent aliphatic saturated hydrocarbon group having 1 to 6 carbon atoms, $R_3$ and $R_4$ are the same or different and are each phenyl, alkyl having 1 to 6 carbon atoms or alkoxyl having 1 to 10 carbon atoms, $R_5$ is alkyl having 1 to 10 carbon atoms, and n is an integer of from 1 to 10, and a vinyl copolymer Y which is prepared from a monomer mixture comprising:
   (i) a polysiloxane macromonomer prepared by reacting about 70 to about 99.999 mole % of a compound (A) represented by the formula

(II)

wherein $R_6$ is an aliphatic hydrocarbon group having 1 to 8 carbon atoms or phenyl, and $R_7$, $R_8$ and $R_9$ are each alkoxyl having 1 to 4 carbon atoms or hydroxyl with about 30 to about 0.001 mole % of a compound (B) represented by the formula

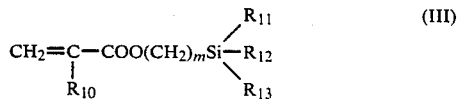

(III)

wherein $R_{10}$ is a hydrogen atom or methyl, $R_{11}$, $R_{12}$ and $R_{13}$ are each hydroxyl, alkoxyl having 1 to 4 carbon atoms or an aliphatic hydrocarbon group having 1 to 8 carbon atoms, at least one of $R_{11}$, $R_{12}$ and $R_{13}$ being hydroxyl or alkoxyl, and m is an integer of 1 to 6, the polysiloxane macromonomer having per molecule at least two functional groups selected from hydroxyl and the alkoxyl and being about 400 to about 100,000 in number average molecular weight, and
- (ii) an oxirane-containing vinyl monomer,
- (b) a metal chelate compound capable of acting as a curing agent, and
- (c) a reactive diluent which is a compound having a number average molecular weight of up to about 1,000 and containing at least two alicyclic oxirane groups in the molecule.

2. A resin composition as defined in claim 1 wherein the oxirane-containing vinyl monomer is a vinyl monomer containing an alicyclic oxirane group.

3. A resin composition as defined in claim 1 wherein the oxirane-containing vinyl monomer is an acrylic or methacrylic acid ester containing an alicyclic oxirane group.

4. A resin composition as defined in claim 1 wherein the copolymer X is prepared from 1 part by weight of the alkoxysilane-containing vinyl monomer and about 0.02 to about 10,000 parts by weight of the oxirane-containing vinyl monomer.

5. A resin composition as defined in claim 4 wherein the copolymer X is about 2,000 to about 50,000 in number average molecular weight.

6. A resin composition as defined in claim 1 wherein the compound (A) is at least one compound selected from the group consisting of methyltrimethoxysilane, phenyltrimethoxysilane, butyltrimethoxysilane, methyltriethoxysilane, methyltributoxysilane, phenyltrisilanol and methyltrisilanol.

7. A resin composition as defined in claim 1 wherein the compound (B) is at least one compound selected from the group consisting of β-acryloxyethyltriethoxysilane, β-methacryloxyethyltriethoxysilane, γ-methacryloxypropyltrimethoxysilane, γ-methacryloxypropyltriethoxysilane, γ-acryloxypropyltrimethoxysilane, γ-methacryloxybutyltriethoxysilane, and γ-acryloxypropyltrisilanol.

8. A resin composition as defined in claim 1 wherein the polysiloxane macromonomer has about 0.2 to about 1.9 polymerizable unsaturated bonds per molecule on the average.

9. A resin composition as defined in claim 1 wherein the vinyl copolymer is prepared from about 0.01 to about 98 wt. % of the polysiloxane macromonomer and about 99.9 to about 2 wt. % of the oxirane-containing vinyl monomer.

10. A resin composition as defined in claim 1 wherein the vinyl copolymer is about 2,000 to about 100,000 in number average molecular weight.

11. A resin composition as defined in claim 1 wherein the chelate compound is at least one of aluminum chelate compound, titanium chelate compound and zirconium chelate compound.

12. A resin composition as defined in claim 1 which comprises about 0.01 to about 30 parts by weight of the chelate compound per 100 parts by weight of the combined amount of the component (a) and the component (c).

13. A resin composition as defined in claim 1 which comprises about 0.1 to about 1,000 parts by weight of the component (c) per 100 parts by weight of the component (a).

* * * * *